United States Patent
Bourget et al.

(10) Patent No.: US 6,733,718 B2
(45) Date of Patent: May 11, 2004

(54) METHOD OF MANUFACTURING A TUBULAR MEMBER MADE OF SYNTHETIC MATERIAL, AND A TUBE AND A SHEATH MANUFACTURED BY THE METHOD

(75) Inventors: Vincent Bourget, Marly le Roi (FR); Jean-Pierre Bonicel, Rueil Malmaison (FR)

(73) Assignee: Alcatel, Paris (FR)

( * ) Notice: Subject to any disclaimer, the term of this patent is extended or adjusted under 35 U.S.C. 154(b) by 44 days.

(21) Appl. No.: 10/012,406

(22) Filed: Dec. 12, 2001

(65) Prior Publication Data

US 2002/0084557 A1 Jul. 4, 2002

(30) Foreign Application Priority Data

Dec. 28, 2000 (FR) .............................. 00 17189

(51) Int. Cl.⁷ .............................................. B29C 47/88
(52) U.S. Cl. .................. 264/558; 264/211.13; 264/563
(58) Field of Search ................................ 264/558, 563, 264/209.3, 162, 211.13

(56) References Cited

U.S. PATENT DOCUMENTS

| | | | | |
|---|---|---|---|---|
| 3,103,409 A | * | 9/1963 | Bohres et al. ............ 264/209.7 |
| 3,508,554 A | * | 4/1970 | Sheridan ...................... 604/523 |
| 4,078,033 A | * | 3/1978 | Czerwon et al. ......... 264/178 R |
| 4,329,314 A | * | 5/1982 | Jackson et al. .............. 264/519 |
| 4,519,975 A | * | 5/1985 | Neumann .................... 264/526 |
| 4,663,107 A | * | 5/1987 | Takada et al. ............... 264/519 |
| 4,774,146 A | * | 9/1988 | Dehennau et al. .......... 428/518 |
| 5,248,472 A | * | 9/1993 | Yoshikawa et al. ......... 264/519 |
| 5,316,706 A | * | 5/1994 | Muni et al. .................. 264/472 |
| 5,422,063 A | * | 6/1995 | Pelzer ...................... 264/209.1 |

FOREIGN PATENT DOCUMENTS

EP  0 870 963 A2  10/1998
EP  1 001 503 A1   5/2000

OTHER PUBLICATIONS

Database WPI, Section CH, Week 198638, Derwent Publications Ltd., London, GB, Class A176, AN 1986–249106, XP002177799 corresponding to JP 61 177234 A. (Yoshino Kogyosho Co Ltd) dated Aug. 8, 1986.
Patent Abstracts of Japan, vol. 2000, No. 6, Sep. 22, 2000 corresponding to JP 200 074038 A (Tokiwa Chemical Kogyo KK: System Technical) dated Mar. 7, 2000.

* cited by examiner

Primary Examiner—Mark Eashoo
(74) Attorney, Agent, or Firm—Sughrue Mion, PLLC

(57) ABSTRACT

The invention relates to a method of manufacturing a tubular member made of synthetic material, the method being of the type in which the tubular member is extruded. In the method, during extrusion of the tubular member, the extruded synthetic material is subjected to a flow of water in liquid or steam form that comes into contact with the inside or the outside surface of the tubular member in such a manner as to form crevices in the surface of the tubular member that comes into contact with the flow of water. The extruded synthetic material is preferably subjected to a flow of water in liquid form. The surface including the crevices forms a low-friction surface. Application to making optical fiber cable networks in which the cables are inserted into tubes by carrying or blowing methods.

11 Claims, 1 Drawing Sheet

METHOD OF MANUFACTURING A TUBULAR MEMBER MADE OF SYNTHETIC MATERIAL, AND A TUBE AND A SHEATH MANUFACTURED BY THE METHOD

The present invention relates to a method of manufacturing a tubular member made of synthetic material and to a tube and a sheath manufactured by the method.

The invention applies in particular to making optical fiber cable networks.

BACKGROUND OF THE INVENTION

Usually, an optical fiber cable comprises a plurality of optical fibers housed in a sheath made of synthetic material, in particular extruded synthetic material. In most optical fiber networks, cables are housed in tubes that are generally made of extruded synthetic material. In order to thread an optical fiber cable into a tube, various methods are used, in particular blowing and carrying methods. In a carrying method, the optical fiber cable is pushed into the tube by being entrained in a flow of air under pressure that is injected into the tube. The effectiveness of the carrying method is limited, in particular by friction between the outside surface of the sheath of the optical fiber cable and the inside surface of the tube.

In addition, the effectiveness of a blowing method is limited, in particular by friction problems.

OBJECTS AND SUMMARY OF THE INVENTION

A particular object of the invention is to optimize the effectiveness of mounting an optical fiber cable in a tube by a conventional carrying or blowing method.

To this end, the invention provides a method of manufacturing a tubular member made of synthetic material, the method being of the type in which the tubular member is extruded, and during extrusion of the tubular member, the extruded synthetic material is subjected to a flow of water in liquid or steam form that comes into contact with the inside or the outside surface of the tubular member in such a manner as to form crevices in the surface of the tubular member that comes into in contact with the flow of water, the surface including the crevices being known as the "low-friction surface".

According to the characteristics of various implementations of the method:

the extruded synthetic material is subjected to a flow of water in liquid form;

the flow of water comes into contact with the inside surface of the tubular member;

the tubular member is extruded in an extruder head including a duct for injecting the flow of water into the vicinity of the inside surface of the tubular member;

the duct for injecting the flow of water into the vicinity of the inside surface of the tubular member is a duct for injecting a lubricant into contact with the inside surface of the tubular member, the water being injected into the lubricating duct instead of the lubricant;

the flow of water comes into contact with the outside surface of the tubular member;

the flow of water is injected into a nozzle directed towards the outside surface of the tubular element;

the synthetic material is a thermoplastics material; and the synthetic material is polyethylene.

The invention also provides a tube to form a housing for an elongate member such as a cable, in particular an optical fiber cable, the tube being manufactured by a method as defined above, the inside surface of the tube being the low-friction surface.

The invention further provides a sheath for a cable, in particular an optical fiber cable, the sheath being manufactured by a method as defined above, the outside surface of the sheath being the low-friction surface.

BRIEF DESCRIPTION OF THE DRAWINGS

The invention will be better understood on reading the following description, given by way of example only, and with reference to the accompanying drawings, in which.

MORE DETAILED DESCRIPTION

Figure 1:
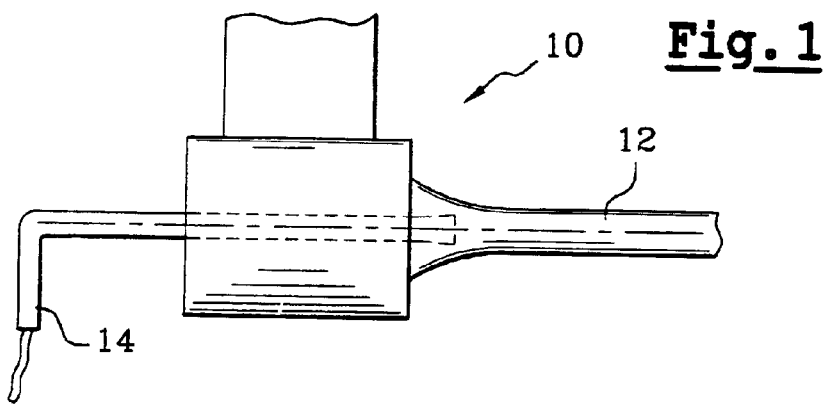
FIG. 1 is a diagrammatic view of an extruder head for implementing a method constituting a first implementation of the invention.
Figure 2:
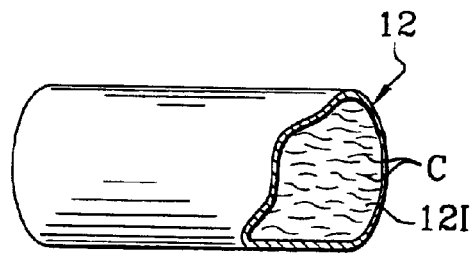
FIG. 2 is a diagrammatic view of a tube of the invention manufactured by the extruder head shown in FIG. 1.

FIG. 1 is a diagram showing a conventional extruder head 10 for manufacturing a tubular member 12 by extruding synthetic material, and more particularly, for manufacturing a tube 12 as shown in FIG. 2. The tube 12 is to form a housing for an elongate member such as a cable, in particular an optical fiber cable.

The extruder head 10 conventionally includes a duct 14 for injecting a lubricant, in particular grease, into contact with the inside surface 12I of the tubular member 12. The lubricating duct 14 is also known as a "needle".

In a method constituting a first implementation of the invention using the extruder head 10 shown in FIG. 1, and during extrusion of the tubular member 12, the extruded synthetic material is subjected to a flow of water in liquid or steam form that comes into contact with the inside surface 12I of the tubular member 12. To this end, the flow of water in liquid or steam form is injected into the lubricating duct instead of the lubricant, in such a manner that the flow of water comes into contact with the inside surface 12I of the tubular member 12. Where applicable, the flow of water could be injected by a generator for generating water under pressure (liquid or steam), the generator being connected to the lubricating duct 14.

In a variant, it is possible to use a duct 14 that is different from the lubricating duct and that is located in the extruder head 10 so as to be able to inject the flow of water into the vicinity of the inside surface 12I of the tubular member 12. The optimum distance between the opening end of the duct 14 and the inside surface 12I of the tubular member 12 can be adjusted by the person skilled in the art by performing successive trials.

The extruded synthetic material is a thermoplastic material, e.g. polyethylene. Its extrusion temperature usually lies in the range 200° C. to 270° C. On coming into contact with the extruded material, the water in liquid or steam form is at a temperature well below the extrusion temperature of the synthetic material and it causes crevices C to be formed over the surface of the tubular member that comes into contact with the flow of water.

The water that comes into contact with the extruded material is preferably cold liquid water having a temperature of approximately 20° C., for example.

The inside surface 12I of the tube 12 that includes the crevices C constitutes a surface having friction that is low in particular relative to the sheath of a cable for inserting into the tube 12 by a conventional carrying or blowing method.

Figure 3:
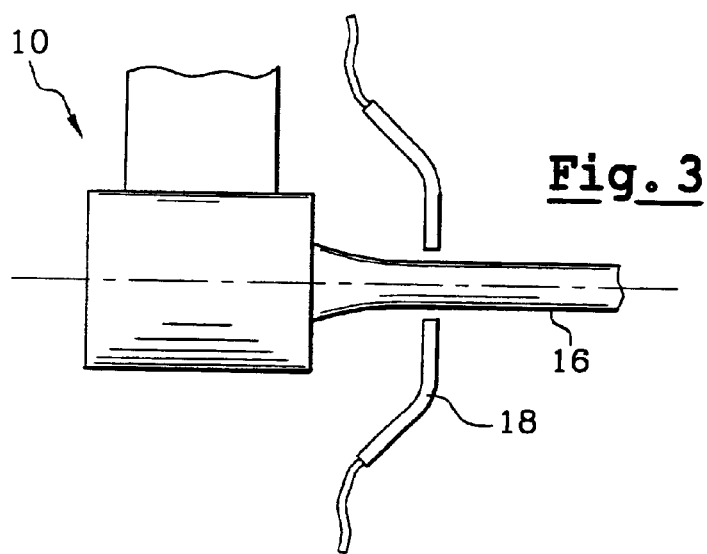
FIG. 3 is a view similar to FIG. 1 of an extruder head for implementing a method constituting a second implementation of the invention.
Figure 4:
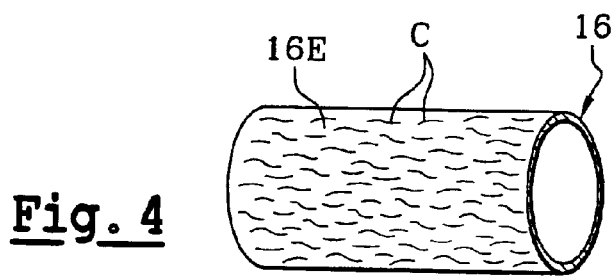
FIG. 4 is a diagrammatic view of a cable sheath of the invention manufactured by the extruder head shown in FIG. 3.

FIG. 3 is a diagram showing a conventional extruder head 10 for manufacturing a tubular member 16 by extruding synthetic material, and more particularly, for manufacturing a cable sheath 16 as shown in FIG. 4. The sheath 16 is to surround the optical fibers of an optical cable.

In a method constituting a second implementation of the invention using the extruder head 10 shown in FIG. 3, during extrusion of the tubular member 16, the extruded synthetic material is subjected to a flow of water in liquid or steam form that comes into contact with the outside surface 16E of the tubular member 16. To this end, the flow of water in liquid or steam form is injected into at least one nozzle 18 in such a manner that the flow of water comes into contact with the outside surface 16E of the tubular member 16. As shown in FIG. 3, the water may possibly be injected into two or more nozzles 18. In a manner similar to the first implementation, where applicable, the flow of water could be injected by a generator for generating water under pressure (liquid or steam), the generator being connected to the nozzle 18.

The optimum distance between the opening end of each nozzle 18 and the outside surface 16E of the tubular member 16 can be adjusted by the person skilled in the art by performing successive trials.

The contact of the water with the outside surface 16E of the tubular member 16 causes crevices C to be formed over the outside surface 16E. As a result, the outside surface 16E constitutes a surface having friction that is low in particular relative to the inside surface of a tube in which the cable provided with the sheath 16 is for insertion by a conventional carrying or blowing method.

What is claimed is:

1. A method of manufacturing a tubular member made of synthetic material, the method being of the type in which the tubular member is extruded, said method comprising, during extrusion of the tubular member, forming crevices in the inside or outside surface of the tubular member by contacting the inside or the outside surface of the tubular member with a flow of water in liquid or steam form in such a manner as to form crevices in the inside or outside surface that comes into contact with the flow of water, the surface including the crevices being known as the "low-friction surface".

2. A method of manufacturing a tubular member according to claim 1, wherein the water is in liquid form.

3. A method of manufacturing a tubular member according to claim 1, wherein the flow of water comes into contact with the inside surface of the tubular member.

4. A method of manufacturing a tubular member according to claim 3, wherein the tubular member is extruded in an extruder head having a duct leading to an interior of the head, and wherein said method further comprises injecting the flow of water through said duct into the vicinity of the inside surface of the tubular member.

5. A method of manufacturing a tubular member according to claim 1, wherein the flow of water comes into contact with the outside surface of the tubular member.

6. A method of manufacturing a tubular member according to claim 5, wherein the flow of water is injected into a nozzle directed towards the outside surface of the tubular element.

7. A method of manufacturing a tubular member according to claim 1, wherein the synthetic material is a thermoplastics material.

8. A method of manufacturing a tubular member according to claim 7, wherein the synthetic material is polyethylene.

9. The method according to claim 1, comprising choosing, as the tubular member, a tube for housing an elongate member, the inside surface of the tube being the low-friction surface.

10. The method according to claim 1, comprising choosing, as the tubular member, a sheath for a cable, the outside surface of the sheath being the low-friction surface.

11. The method according to claim 1, wherein the tubular member has an extrusion temperature in the range of 200° C. to 270° C, and wherein said method further comprises choosing the water to be liquid water having a temperature of approximately 20° C.

* * * * *